United States Patent [19]

Crewdson et al.

[11] Patent Number: 5,611,421
[45] Date of Patent: Mar. 18, 1997

[54] METHOD OF INSTALLING MULTIPLE-LIFT CONVEYOR SYSTEM

[75] Inventors: Lawrence S. Crewdson; Donald A. Shaw, both of Milwaukee, Wis.

[73] Assignee: Lake Shore Mining Company, Inc., Milwaukee, Wis.

[21] Appl. No.: 388,322

[22] Filed: Feb. 14, 1995

[51] Int. Cl.⁶ ............................................. B65G 15/24
[52] U.S. Cl. ........................... 198/607; 198/866; 299/18; 299/64
[58] Field of Search .................................. 198/607, 617, 198/812, 866, 832.1; 405/133; 299/18, 64

[56] References Cited

U.S. PATENT DOCUMENTS

| | | | |
|---|---|---|---|
| 3,300,028 | 1/1967 | Landrey et al. | 198/607 |
| 4,195,726 | 4/1980 | Denny et al. | 198/812 |
| 5,188,218 | 2/1993 | Kuzik | 198/812 |

FOREIGN PATENT DOCUMENTS 3826875  2/1990  Germany ........................... 198/832.1

OTHER PUBLICATIONS

New York City Water Tunnel Project S–Belt Installation Installation Instructions; Lake Shore Mining Co., Inc.; May 12, 1994, 8 pages.

*Primary Examiner*—Joseph E. Valenza
*Attorney, Agent, or Firm*—King and Schickli

[57]  ABSTRACT

A method of installing a multiple lift, vertical conveyor system in a conveyor shaft includes steps of: erecting a framework for the vertical conveyor system, installing a first belt for operation on the framework; feeding a second belt into position for installation on the framework by advancing the second belt on the first belt and installing the second belt for operation on the framework.

16 Claims, 3 Drawing Sheets

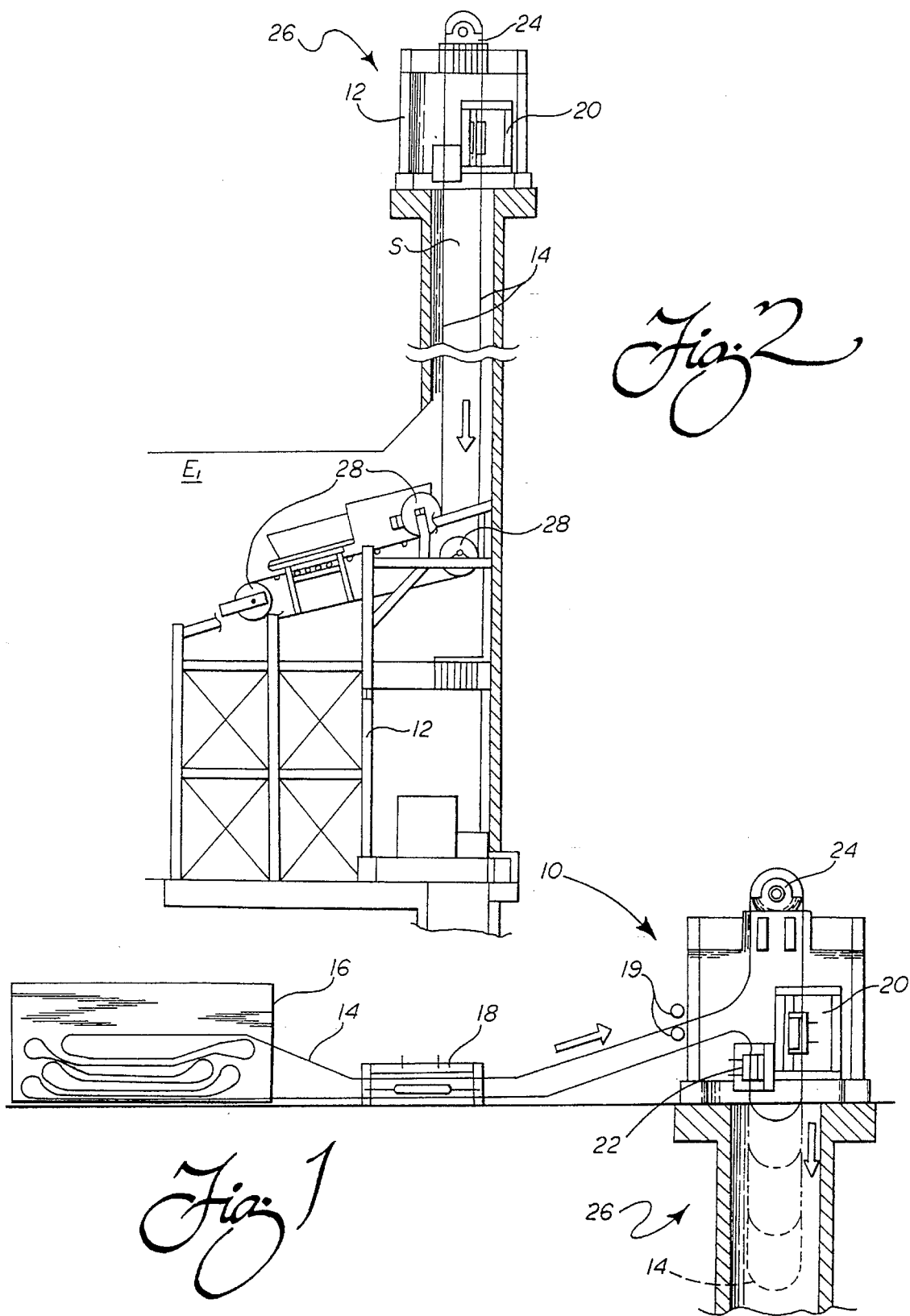

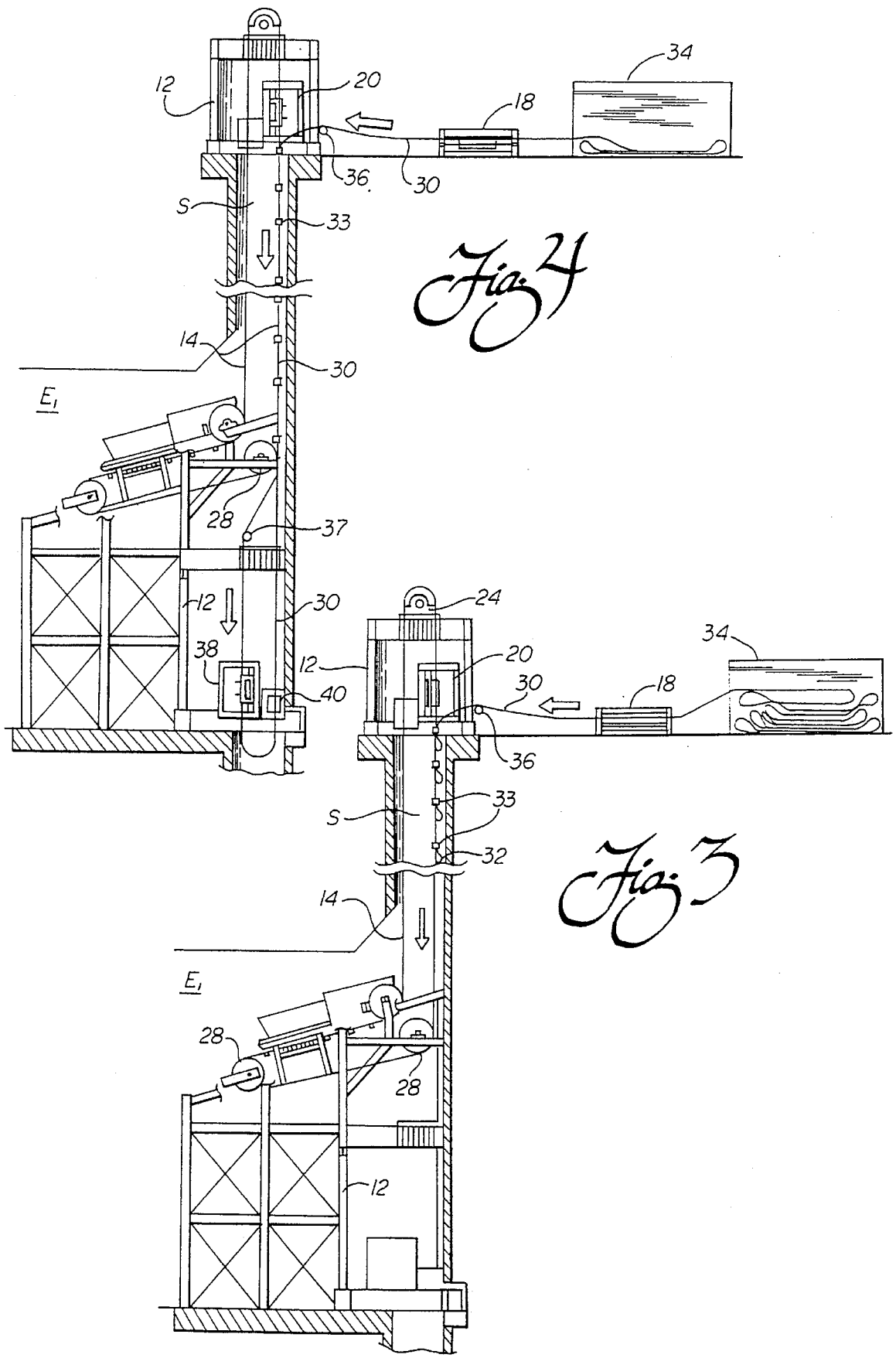

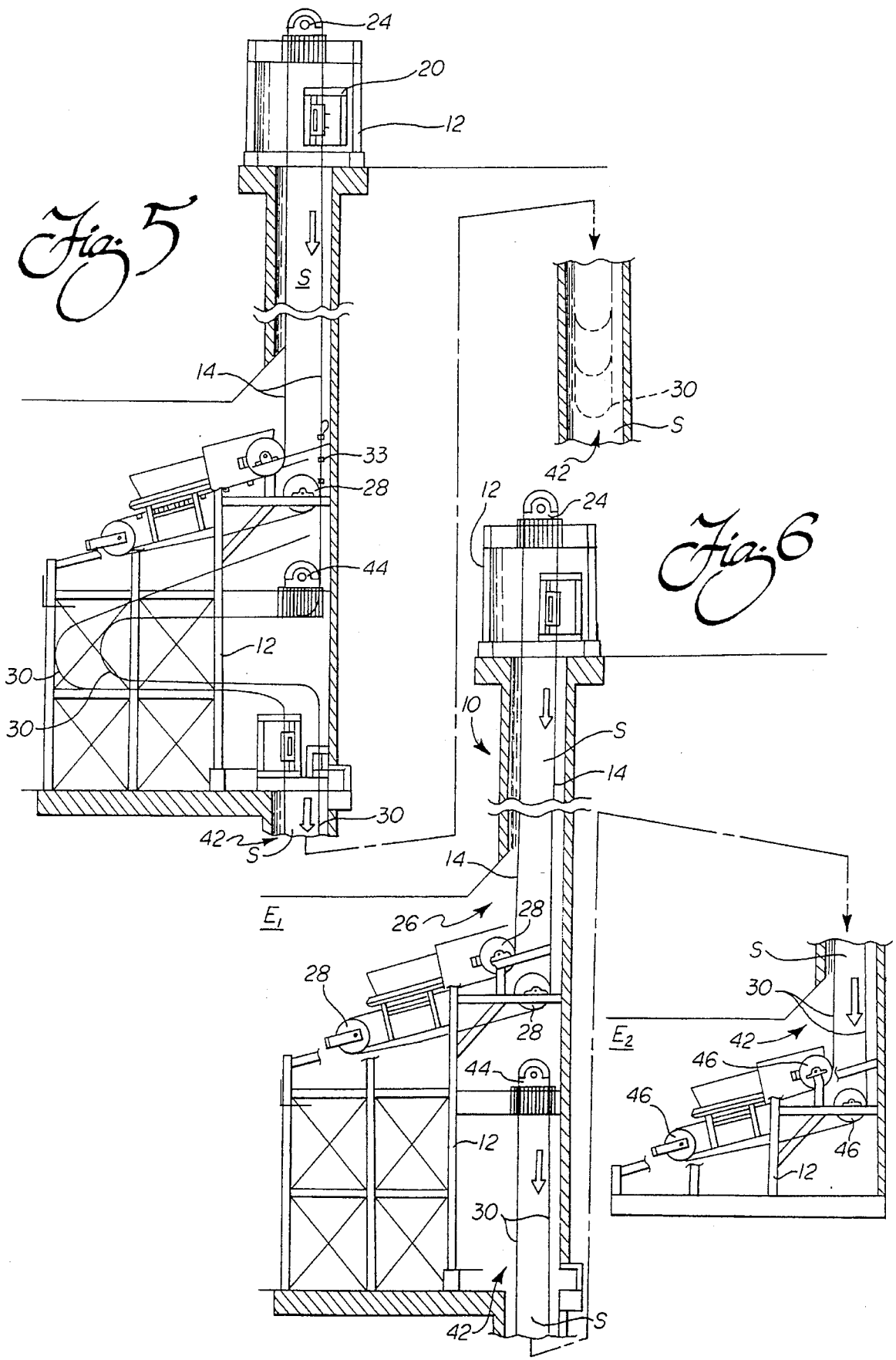

METHOD OF INSTALLING MULTIPLE-LIFT CONVEYOR SYSTEM

TECHNICAL FIELD

The present invention relates generally to the material handling field and, more particularly, to a method of installing a multiple lift, vertical conveyor system in a conveyor shaft.

BACKGROUND OF THE INVENTION

Conveyors have long been utilized to handle large quantities of bulk material and convey that material from one point to another point. Vertical lift conveyor systems of a type utilized in mining operations that extend through a vertical conveyor shaft are also well known. Such vertical conveyor systems incorporate a framework including a head frame for holding and supporting a drive pulley and a base frame for holding and supporting various pulleys that engage and support a conveyor belt. The conveyor belt is equipped with various sidewalls, cleat bases and cleats to hold the material during vertical conveyance from a lower level of the conveyor shaft to an upper level of the conveyor shaft or the surface above the mine.

The conveyor belts utilized in vertical conveyor systems typically weigh up to 60 kg/m or more. Accordingly, a continuous belt of approximately 700 m in length can weigh up to 42,000 kg or more. Together, the weight of the belt, the weight of the material to be conveyed by the belt and the horsepower of the drive system for the conveyor conspire to place design limits on the effective length to which any operational single lift conveyor system may be constructed.

Many mines requiring vertical lift conveyor systems are of a depth greater than the fullest length that any individual vertical lift conveyor may be constructed. Accordingly, a multiple lift vertical conveyor system must be utilized at these sites to provide the necessary conveyance function. The present invention relates to a novel method of installing such a multi-lift, vertical conveyor system in a conveyor shaft.

SUMMARY OF THE INVENTION

It is a primary object of the present invention to provide a method for installing a multiple lift, vertical conveyor system in a conveyor shaft in a quick, efficient and cost effective manner.

Another object of the present invention is to provide a method for installing a multiple lift, vertical conveyor system wherein one lift section is installed and made operational and then utilized to aid in installing a belt on a second, adjacent but more remotely located lift section. Such an approach advantageously takes advantage of the force of gravity under the controlling influence of powerful machinery to benefit the installation process.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a method is provided for installing a multiple lift, vertical conveyor system in a conveyor shaft. The method includes the step of erecting a framework for the vertical conveyor system. Next is the installing of a first belt for operation on the framework. This is then followed by the feeding of a second belt into position for installation on the framework. This feeding is accomplished by advancing the second belt on the first belt. This step is then followed by the installing of the second belt for operation on the framework.

More specifically, describing the invention, the step of installing the first belt includes paying out an initial section of the first belt above the head pulley and then inserting the head pulley into position on the head frame where it receives the first belt.

The installing of the first belt also includes gradually feeding the first belt into the conveyor shaft from an upper end of a first lift section of the vertical conveyor system and pulling a lead section of the first belt into a first entry at a lower end of the first lift section of the vertical conveyor system. After gradually feeding all the first belt into the conveyor shaft so that the first belt fits snugly on and is fully supported by the head pulley, there is the installing of the remaining idler and bend pulleys onto the base frame in a position to receive the first belt. Next is the tensioning of the first belt for operation. All of these steps of installing the first belt for operation are well known in the art of vertical conveyor system installation.

Once the first belt is properly centered and the first lift section is prepared for operation the method proceeds with the step of feeding the second belt into position. More specifically, this includes looping the second belt over a belt guide or sleeve and fastening the second belt to the first belt. This fastening may be accomplished by clamp, clip or any other appropriate means known in the art.

The feeding of the second belt into position also includes the additional step of gradually feeding the second belt into the conveyor shaft while simultaneously gradually advancing the second belt down the shaft on the first belt. This includes the unclamping of the second belt from the first belt at the lower end of the first lift section and the clamping of the second belt adjacent an upper end of the second, adjacent lift section immediately below the lower end of the first lift section.

As the second belt is fed by the first belt, the method includes the step of pulling a trailing end of the second belt into the first entry. Once fully received in the first entry, installing of the second belt is completed. This includes the steps of lowering the trailing end of the second belt into the conveyor shaft from the first entry down to a second entry and pulling a leading section of the second belt into the second entry at a lower end of the second lift section of the vertical conveyor system. As described above with respect to the first belt, the installing of the second belt also includes the steps of inserting a head pulley for the second belt, completing the feeding of the second belt so that the second belt fits snugly on and is fully supported by the head pulley, installing idler and bend pulleys onto the base frame to receive the second belt and tensioning the second belt for operation.

Advantageously, it should be appreciated that this method of installation utilizes the powerful clamping machinery of the first lift section to maneuver the second belt into position for installation on the conveyor system framework. Such an installation procedure takes full advantage of the benefit provided by the force of gravity when feeding the second belt downward to the second lift section. In many applications, it would be impossible to deliver the bulky, heavy and cumbersome second belt underground in any other manner. Further, even in situations where it would be possible to do this, it should be appreciated that the method just described is the most effective and efficient approach to achieve this end. Feeding the second belt from the readily accessible surface rather than from a relatively cramped underground entryway is simply a far more convenient and practical approach.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a detailed schematical, side elevational view showing the initial steps of installing and feeding the first belt over the head pulley and down the conveyor shaft;

FIG. 2 is a view similar to FIG. 1, but showing the completed installation of the first belt;

FIG. 3 is a similar view showing the feeding of the second belt by means of the first belt;

FIG. 4 is a similar view to FIGS. 1–3 but showing the feeding process in a more advanced stage of completion;

FIG. 5 shows the feeding process of the second belt in its latter stages; and

FIG. 6 shows the final, complete installation of the first and second belts.

Reference will now be made in detail to the present preferred embodiment of the invention, an example of which is illustrated in the accompanying drawing.

DETAILED DESCRIPTION OF THE INVENTION

Reference is now made to the drawing Figures providing a step-by-step illustration of the method of the present invention of installing a multiple lift, vertical conveyor system 10 in a conveyor shaft S. The method includes the initial step of erecting the framework or superstructure 12, including both head and base frames, for the vertical conveyor system 10 in the conveyor shaft S (see also FIG. 6). Such a framework 12 is generally constructed from steel, although other materials may be utilized, in accordance with techniques and principles well known in the art of vertical conveyor system installation.

Next is the step of installing a first, endless belt 14 for operation on the framework 12 (see FIG. 1). At this point in time the framework 12 is essentially a "naked" framework and does not include a head pulley, or any idler or bend pulleys. Further, the first belt 14 is a "naked" belt and does not include any sidewalls, cleat bases or cleats. The installing of the first belt 14 is accomplished by paying out an initial section of the first belt from the crate 16. This paying out and the gradual feeding of the first belt 14 subsequently described is accomplished in a manner well known in the art utilizing a feed clamp assembly, schematically shown at reference numerals 18. More specifically describing the feed clamp assembly 18, the assembly includes a stationary clamp, traveling clamp and stroking cylinders. Both upward and return strands of the belt 14 are fed by the feed clamp assembly 18 by retracting the stroking cylinders that control the movement of the traveling clamps, setting the traveling clamps, releasing the stationary clamps and stroking the traveling cylinders to advance the traveling clamps for a stroke of approximately 20 inches. When fully advanced, the stationary clamps are again set and the traveling clamps are released. The stroking cylinders are then recycled to retract the traveling clamps to the initial position. This process is completed repeatedly by the feed clamp assembly 18 as the belt 14 is payed out and gradually fed into the conveyor shaft S.

Initially the belt 14 is fed through a pair of temporary pulleys 19 so as to loop over and extend around the position on the framework 12 designed to receive a head pulley 24. The head pulley 24 is then inserted into the belt between the strands and aligned and leveled on the framework 12. Bolts are torqued to hold the head pulley 24 in position on the framework 12 in a manner well known in the art. Next the belt 14 is fed into and engaged by the installation clamp 20 and fixed clamp assembly 22. The feed, installation and fixed clamp assemblies 18, 20 and 22 are then utilized in a cooperating manner, again well known in the art, to gradually feed the first belt 14 into the conveyor shaft S from an upper end of the first lift section 26 in a safe and controlled manner.

Specifically, the feed clamp assembly 18 pays out both the upward and return strands of the first belt 14 from the crate 16. As the first belt 14 is payed out from the crate 16, the installation clamp assembly 20 remains clamped to the return strand and stationary. Once a sufficient amount of slack belt 14 is available (approximately four feet), the feed clamp assembly 18 is locked in position to hold both strands and the installation clamp assembly 20 is operated to feed the slack belt 14 down into the shaft S. Throughout this process the fixed or static clamp assembly 22 remains clamped to the upward strand of the belt 14, supporting its weight. Once the slack belt 14 is fed down the shaft, this "inch worm" process is repeated.

As the feeding of the belt 14 continues, the lower end or leading section of the belt 14 reaches the first entry $E_1$. This leading section of the belt 14 is pulled into the entry $E_1$ as the feeding of the belt continues. When the upper or trailing end of the belt 14 approaches the feed clamp assembly 18 on the surface, the feed clamp assembly 18 is removed and the installation clamp 20 is utilized to lower the belt until it fits snug and is fully supported on the pulley 24. The fixed clamps 22 are then removed. The various idler and bend pulleys 28 (only three shown schematically in FIG. 2) are then installed on the framework 12 to receive the first belt 14. Various adjustments are then made to properly center and tension the belt 14 on the pulleys 24, 28 so that the belt is readied for operation (see FIG. 2).

Next is the step of feeding the second, endless belt 30 into position for installation on the framework 12 (see FIGS. 3–6). This is achieved by placing the second belt within a belt sleeve 32 of a type commercially available from Lake Shore Mining Company, Inc. and specifically designed for the purpose of protecting the belt during installation. The second belt 30 is fastened to the first belt 14 adjacent the belt sleeve 32 by clamps or clips 33 commercially available from Lake Shore Mining Company, Inc. and designed for this purpose.

The second belt 30 is then gradually fed into the conveyor shaft S in the same manner as the first belt 14 utilizing the feed clamp assembly 18 and installation clamp assembly 20. More specifically, the feed clamp assembly 18 gradually draws both strands of the second belt 30 from the crate 34 (now positioned adjacent to conveyor shaft S) in segments of approximately 20 inches in length. Once a sufficient number of segments have been drawn to provide slack of approximately four feet, the installation clamp assembly 20 is utilized to advance the first belt 14 clockwise around the pulleys 24 and 28 and thereby lower the second belt 30 over the temporary pulley 36 into the conveyor shaft S.

As the gradual lowering or feeding of the second belt 30 continues, at approximately every 100 feet, another clamp or clip 33 is utilized to fasten the second belt 30 to the first belt 14 (see FIG. 3). As the lower or leading end of the second belt 30 approaches the lower end of the first lift section 26 (i.e. bend pulley 28), the belt sleeve 32 and lowermost clamp or clip 33 are removed to free the second belt 30 from the first belt 14. This unclamping allows the strands of the second belt 30 to be separated and a temporary pulley 37 inserted therebetween (see FIG. 4). The upward strand is then guided into the installation clamp assembly 38 and the return strand is guided into fixed clamp assembly 40 on the framework 12 at the first entry $E_1$ (again, see FIG. 4). This gradual feeding process continues with the clamps or clips 33 being periodically removed to free the second belt 30 when those clamps or clips reach the lower end of the first lift section 26. Simultaneously, the second belt 30 is fed freely through the installation clamp assembly 38 and fixed clamp assembly 40 (i.e. the clamps are held open) and lowered down the second lift section 42 (see also FIG. 5). Eventually the top or trailing end of the second belt 30 reaches the feed clamp 18. At this point the feed clamp assembly 18 is released from the belt 30 and removed and the installation clamp assembly 20 is utilized to feed the trailing section of the second belt 30 along the first belt 14. A final clamp or clip 33 is utilized to secure the trailing section of the second belt 30 to the first belt 14.

As the second belt 30 is fed or lowered, further by means of the installation clamp assembly 20 and first belt 14, clamps or clips 33 reaching the lower end of the first lift section 26 are removed. Once the upper or trailing end of the second belt 30 is approximately 100 feet from the first entry $E_1$, the installation and fixed clamp assemblies 38 and 40 are actuated to clamp the second belt. With the second belt 30 now held by the clamp assemblies 38 and 40, the installation clamp assembly 20 continues to lower the trailing end of the second belt. The resulting slack of the second belt 30 is pulled into the first entry $E_1$ (see FIG. 5). Once the trailing end of the second belt 30 is lowered to a point where only one clamp 33 secures the second belt to the first belt 14, the temporary pulley 37 is then removed and the head pulley 44 is installed on the framework 12 within the belt strands. The last clamp 33 is then released.

Now the installation clamp assembly 38 and fixed clamp assembly 40 at the upper end of the second lift section 42 assume full responsibility for the further lowering of the second belt 30 into the conveyor shaft S. More specifically, the section of the second belt 30 pulled into the first entry $E_1$ is gradually lowered by operation of these clamp assemblies 38, 40 acting in a cooperating manner already described. Eventually, the lead or lowermost section of the second belt 30 reaches the second entry $E_2$ at a lower end of the second lift section 42 (see FIG. 6). As the installation clamp assembly 38 feeds the final or trailing section of the second belt 30, the second belt is received snugly on the head pulley 44. The fixed clamp assembly 40 is then released and removed. The various idler and bend pulleys 46 (only three shown schematically in the FIG. 6) are then installed on the framework 12. By adjusting these idler and bend pulleys 46, it is possible to center and properly tension the second belt 30 on the framework 12 for operation. Various sidewalls, cleats bases and cleats (not shown) are then added to the first and second belts 14, 30 and the multiple lift, vertical conveyor system 10 is then ready for operation.

While this detailed description refers to the installation of a conveyor system including two lift sections, it should be appreciated that the same theory applies to the installation of a vertical conveyor system incorporating three or more sections of the type described. The belt for each relatively more remote lift section is fed into position for installation on the framework 12 by serially advancing that belt on the previously installed belts of the previously installed lift sections. Advantageously, this method utilizes the powerful machinery of the vertical conveyor system to maximum benefit in the installation process. The heavy equipment clamping assemblies that are used to install the first belt are also used to advance subsequent belts from the surface where greater relative access and work space simplifies the belt handling and installation process. As a result, multiple lift deep mining installations may now be more easily and readily constructed in a convenient and cost effective manner.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of installing a multiple lift, vertical conveyor system in a conveyor shaft, comprising the steps of:

erecting a framework for the vertical conveyor system;

installing a first belt for operation on the framework;

feeding a second belt into position for installation on the framework by advancing the second belt on the first belt; and installing the second belt for operation on the framework.

2. The method set forth in claim 1, wherein said step of installing the first belt includes paying out an initial section of the first belt above a head pulley and inserting the head pulley to receive the first belt.

3. The method set forth in claim 2, wherein said step of installing the first belt includes gradually feeding the first belt into the conveyor shaft from an upper end of a first lift section of the vertical conveyor system and pulling a section of the first belt into a first entry at a lower end of the first lift section of the vertical conveyor system.

4. The method set forth in claim 2, wherein said step of installing the first belt also includes installing idler pulleys onto the framework to receive the first belt and tensioning the first belt for operation.

5. The method set forth in claim 4, wherein said step of feeding the second belt into position includes looping the second belt over a belt sleeve and fastening the second belt to the first belt.

6. The method set forth in claim 5, wherein said step of feeding the second belt into position includes the additional step of gradually feeding the second belt into the conveyor shaft by gradually advancing the second belt on the first belt.

7. The method set forth in claim 6, wherein said step of feeding the second belt into position includes unclamping the second belt from the first belt at the lower end of the first lift section and clamping the second belt adjacent an upper end of a second lift section immediately below a lower end of said first lift section.

8. The method set forth in claim 7, wherein said step of feeding the second belt into position includes pulling a trailing end of the second belt into the first entry as the second belt is fed by the first belt.

9. The method set forth in claim 8, wherein said step of installing the second belt includes lowering the second belt into the conveyor shaft from the first entry down to a second entry and pulling a leading section of the second belt into the second entry at a lower end of the second lift section of the vertical conveyor system.

10. The method set forth in claim 9, wherein said step of installing the second belt includes inserting a head pulley for the second belt, completing the feeding of the second belt so that the second belt fits snugly on the head pulley, installing idler pulleys onto the framework to receive the second belt and tensioning the second belt for operation.

11. The method set forth in claim 1, wherein said step of feeding the second belt into position includes looping the second belt over a belt sleeve and fastening the second belt to the first belt.

12. The method set forth in claim 11, wherein said step of feeding the second belt into position includes the additional step of gradually feeding the second belt into the conveyor shaft by gradually advancing the second belt on the first belt.

13. The method set forth in claim 12, wherein said step of feeding the second belt into position includes unclamping the second belt from the first belt at the lower end of the first lift section and clamping the second belt adjacent an upper end of a second lift section immediately below a lower end of said first lift section.

14. The method set forth in claim 13, wherein said step of feeding the second belt into position includes pulling a trailing end of the second belt into the first entry as the second belt is fed by the first belt.

15. The method set forth in claim 14, wherein said step of installing the second belt includes lowering the second belt into the conveyor shaft from the first entry down to a second entry and pulling a leading section of the second belt into the second entry at a lower end of the second lift section of the vertical conveyor system.

16. The method set forth in claim 15, wherein said step of installing the second belt includes inserting a head pulley for the second belt, completing the feeding of the second belt so that the second belt fits snugly on the head pulley, installing idler pulleys onto the framework to receive the second belt and tensioning the second belt for operation.

* * * * *